(12) United States Patent
Reynolds (10) Patent No.: US 10,993,362 B2
(45) Date of Patent: May 4, 2021

(54) CONSUMABLE SHIN FOR A TILLAGE SHANK WITH ADJUSTABLE DEPTH FERTILIZER TUBE

(71) Applicant: Jeffery M. Reynolds, Corfu, NY (US)

(72) Inventor: Jeffery M. Reynolds, Corfu, NY (US)

(*) Notice: Subject to any disclaimer, the term of this patent is extended or adjusted under 35 U.S.C. 154(b) by 156 days.

(21) Appl. No.: 16/047,228

(22) Filed: Jul. 27, 2018

(65) Prior Publication Data

US 2019/0047042 A1     Feb. 14, 2019

Related U.S. Application Data

(60) Provisional application No. 62/543,517, filed on Aug. 10, 2017.

(51) Int. Cl.
| | | |
|---|---|---|
| *A01B 35/22* | (2006.01) | |
| *A01B 15/02* | (2006.01) | |
| *A01B 15/06* | (2006.01) | |
| *E02F 9/28* | (2006.01) | |

(52) U.S. Cl.
CPC .......... *A01B 35/225* (2013.01); *A01B 15/025* (2013.01); *A01B 15/06* (2013.01); *E02F 9/2875* (2013.01)

(58) Field of Classification Search
CPC ...... E02F 9/2875; A01B 15/025; A01B 15/06; A01B 35/225
USPC ................................................. 172/719, 772
See application file for complete search history.

(56) References Cited

U.S. PATENT DOCUMENTS

| | | | | |
|---|---|---|---|---|
| 576,092 | A * | 2/1897 | Conley .................. | A01B 15/06 172/753 |
| 756,849 | A * | 4/1904 | Gwynes ............... | A01B 15/025 172/700 |
| 1,199,329 | A * | 9/1916 | Abramson ............. | A01B 15/06 172/753 |
| 2,689,514 | A * | 9/1954 | Ferguson ............. | A01B 69/004 172/447 |
| 2,876,853 | A * | 3/1959 | Christofferson ....... | A01B 39/20 172/753 |
| 3,001,591 | A * | 9/1961 | Johnson ............... | A01B 15/025 172/700 |
| 3,002,574 | A * | 10/1961 | Padrick ................ | A01B 15/025 172/699 |
| 3,085,635 | A * | 4/1963 | Livermore ............ | E02F 9/2875 172/699 |
| 3,171,500 | A * | 3/1965 | Dils ...................... | A01B 35/225 172/700 |

(Continued)

*Primary Examiner* — Thomas B Will
*Assistant Examiner* — Joel F. Mitchell
(74) *Attorney, Agent, or Firm* — Michael J. Nickerson; Basch & Nickerson LLP (57) ABSTRACT

A consumable shin for a tillage shank includes an integral U-shaped shin having a first side, a second side, and a bottom; the first side and the second side being spaced apart to form a volume therebetween; the first side having a first side surface having first side length and a first side width; the second side having a second side surface having a second side length and a second side width; the first side length being from a rear edge of a guard of a shoe engaging the tillage shank to a forward edge of a first side shield engaging the tillage shank; the second side length being from the rear edge of the guard of the shoe engaging the tillage shank to a forward edge of a second side shield engaging the tillage shank.

18 Claims, 8 Drawing Sheets

(56) References Cited

U.S. PATENT DOCUMENTS

| | | | |
|---|---|---|---|
| 3,387,668 A * | 6/1968 | Mathers | A01B 35/225 172/719 |
| 3,536,147 A * | 10/1970 | Norton et al. | A01B 15/025 172/719 |
| 3,749,177 A * | 7/1973 | Keyser et al. | A01B 39/19 172/44 |
| 3,792,735 A * | 2/1974 | Radigan | E02F 9/2833 172/753 |
| 3,854,429 A | 12/1974 | Blair | |
| 4,127,073 A | 11/1978 | Blair | |
| 4,381,823 A | 5/1983 | Dietrich, Sr. | |
| 4,446,927 A * | 5/1984 | Robertson | A01B 35/225 172/713 |
| 4,592,294 A | 6/1986 | Dietrich, Sr. et al. | |
| 4,638,748 A | 1/1987 | Kopecky | |
| 4,760,806 A | 8/1988 | Bigbee et al. | |
| 4,770,112 A | 9/1988 | Neumeyer | |
| 4,799,823 A * | 1/1989 | Williams | A01B 13/08 172/719 |
| 4,867,248 A * | 9/1989 | Robertson et al. | A01B 15/025 172/753 |
| 5,136,954 A | 8/1992 | Fetaz et al. | |
| 5,165,487 A * | 11/1992 | Williams et al. | A01B 15/025 172/699 |
| 5,947,209 A * | 9/1999 | Halford et al. | A01B 15/025 172/714 |
| 5,964,300 A * | 10/1999 | Wattonville et al. | A01B 13/08 172/700 |
| 5,996,514 A * | 12/1999 | Arriola et al. | A01M 17/002 111/124 |
| 6,178,900 B1 | 1/2001 | Dietrich, Sr. | |
| 6,425,445 B1 | 7/2002 | Tarver, III | |
| 6,554,078 B1 | 4/2003 | McDonald | |
| 7,669,537 B1 | 3/2010 | Hall et al. | |
| 7,866,270 B2 | 1/2011 | Ankenman | |
| 7,891,436 B2 | 2/2011 | Cruson | |
| 8,087,470 B2 | 1/2012 | Kovach et al. | |
| 8,087,471 B2 | 1/2012 | Kovach et al. | |
| 8,186,450 B2 | 5/2012 | Bauer | |
| 9,032,885 B2 | 5/2015 | Cruson et al. | |
| 9,699,947 B2 * | 7/2017 | Wendte et al. | A01B 35/20 |

\* cited by examiner

CONSUMABLE SHIN FOR A TILLAGE SHANK WITH ADJUSTABLE DEPTH FERTILIZER TUBE

PRIORITY INFORMATION

The present application claims priority, under 35 U.S.C. § 119(e), from U.S. Provisional Patent Application, Ser. No. 62/543,517, filed on Aug. 10, 2017. The entire content of U.S. Provisional Patent Application, Ser. No. 62/543,517, filed on Aug. 10, 2017, is hereby incorporated by reference.

BACKGROUND

Conventional tillage shanks have been provided with a delivery tube for the purpose of placing fertilizer or other substance below the surface of the ground at the same time the moving shank is cutting through and working the soil. Some conventional shank assemblies include a tube that has been permanently welded to the shank at a fixed location. In other conventional situations, the farmer may obtain tubes separately from the shanks and then weld the tubes to the shanks.

A problem with the welded-on design is that if the farmer desires to apply fertilizer at different depths in varying conditions, the farmer must change the depth of the shank as well, whether changing the shank depth is optimum for the situation at hand or not. Some conventional units provide fertilizer tubes that can be adjusted relative to the shank, but such adjustments are difficult to make and are time-consuming.

Figure 1:
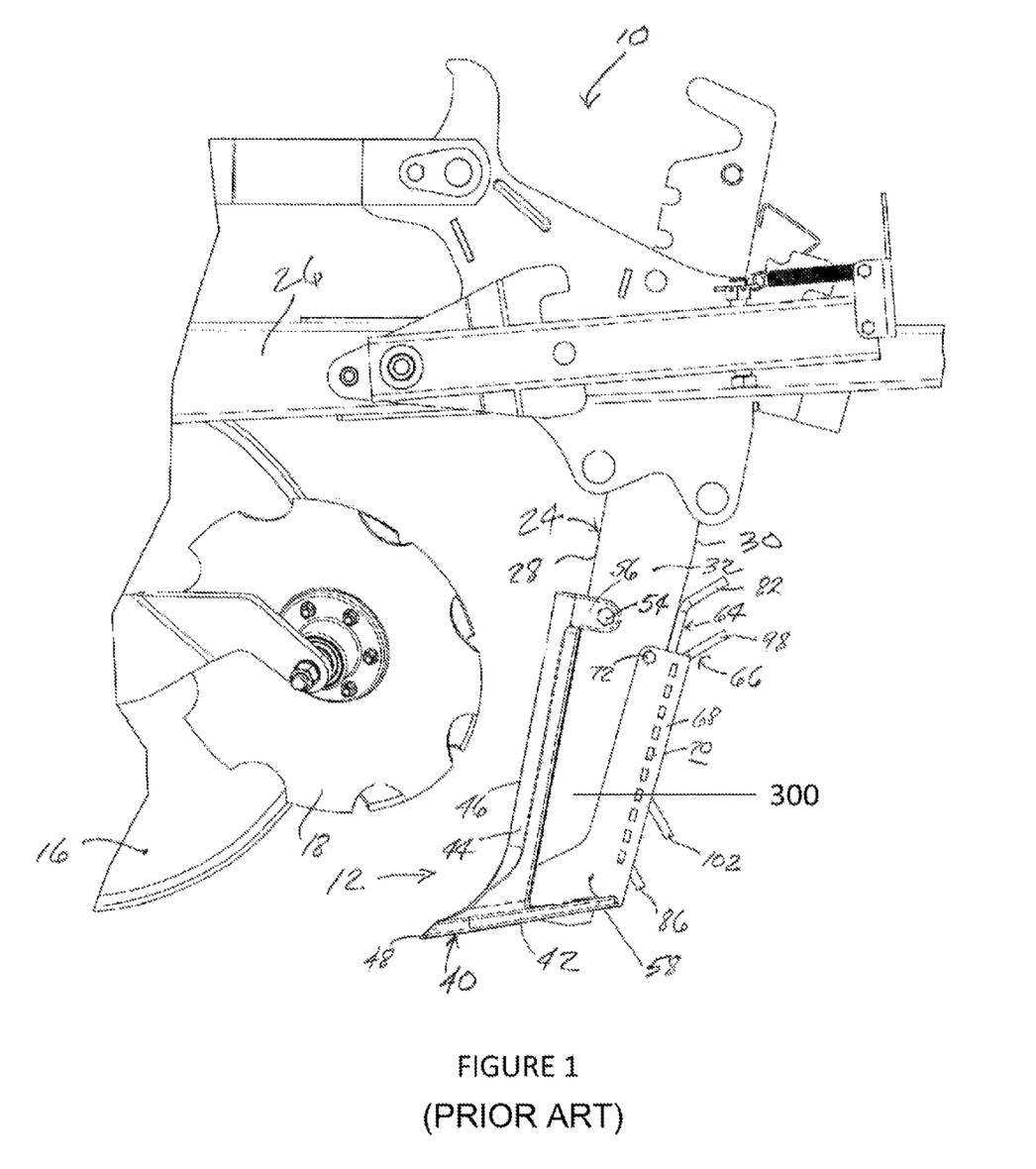
FIG. 1 illustrates a conventional tillage device.
Figure 2:
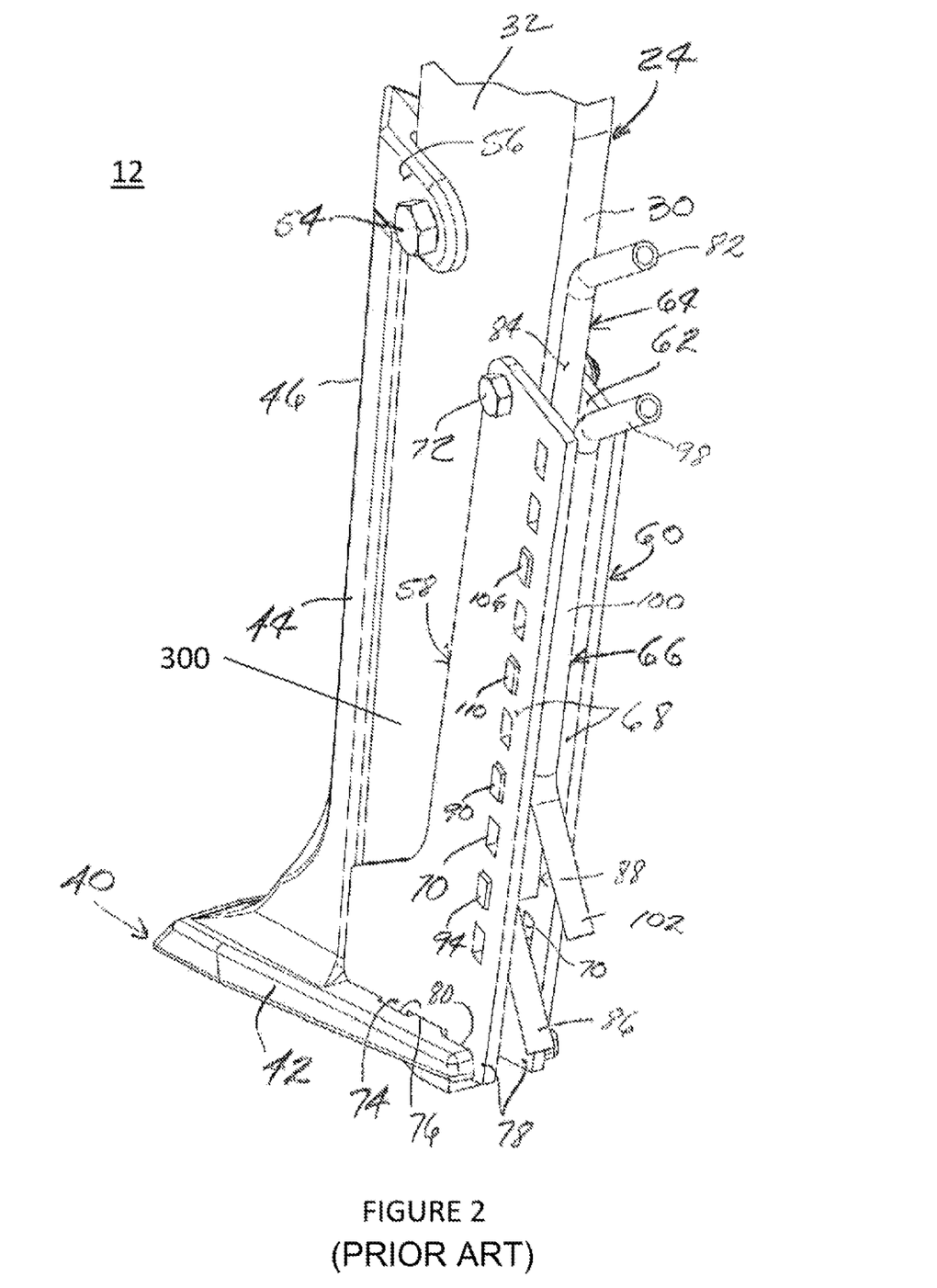
FIG. 2 illustrates the shank assembly of FIG. 1.

Another example of a conventional tillage shank having a delivery tube for the purpose of placing fertilizer or other substance below the surface of the ground at the same time the moving shank is cutting through and working the soil is illustrated in FIGS. 1 and 2.

As illustrated in FIGS. 1 and 2, shank assembly 12 includes an elongated, generally upright, slightly rearwardly inclined, flat shank 24 that is adjustably supported by a horizontal frame 26 of device 10 for selective positioning in any one of a number of vertically adjusted positions. Shank 24 is rectangular in transverse cross-section, having a flat front edge 28, a flat rear edge 30, and a pair of wide, flat, left and right sides 32. Shank 24 also has a lowermost bottom edge and is provided with a rearwardly facing notch 38 (FIG. 6) in rear edge 30 near bottom edge.

Shank assembly 12 further includes a point or shoe broadly denoted by the numeral 40 and detachably secured to shank 24. Point 40 is designed to make the primary contacting engagement with the soil along front edge 28 instead of shank 24 so as to avoid premature wear of edge 28. Thus, point 40 is constructed of a hardened material and is designed to be a replaceable (consumable) unit.

Point 40 is generally L-shaped when viewed in side elevation and includes a generally horizontal leg comprising a base 42 and a generally upright leg comprising a front edge guard 4 4. Guard 44 and base 42 are integrally connected parts of a single, L-shaped unit.

Guard 44 is slightly wider than front edge 28 of shank 24 and butts up against front edge 28 when point 40 is in place. A generally upright beveled leading edge 46 of guard 44 serves to cut through the soil in the slit made by a coulter 16 and to progressively widen such slit to permit the passage therethrough of the remaining width of shank assembly 12.

As illustrated in FIGS. 1 and 2, base 42 has a relatively broad, flat chisel nose 48 that progressively transitions to leading edge 46. Base 42 is also substantially wider than guard 44 and shank 24 so as to present a pair of shelf-like wing portions that lead rearwardly from chisel nose 48 and project laterally outwardly from opposite sides of shank 24. Immediately behind guard 44 within base 42 is a centrally disposed opening that receives the lower end portion of shank 24 and through which bottom edge projects.

A rear cross bar defines the rear extremity of opening and spans the two opposite wing portions of base 42 behind opening. Notch 38 in shank 24 receives cross bar so as to properly locate base 42 relative to the lower end of shank 24 and to provide a sturdy interconnection therebetween.

At the upper end of guard 44, point 40 is held on shank 24 by a transverse bolt 54 passing through shank 24 and a pair of ears 56 that project rearwardly from guard 44 and embrace opposite sides of shank 24.

Shank assembly 12 further includes a pair of generally L-shaped, flat, side shield plates 58 and 60 held on opposite sides 32 of shank 24. Plates 58 and 60 are disposed in such a position relative to shank 24 that they project rearwardly beyond shank rear edge 30 and cooperatively define a gap or generally U-shaped channel 62 (FIG. 2) immediately behind rear edge 30. Such gap 62 is adapted to receive and protectively house a pair of generally upright delivery tubes 64 and 66 for fertilizer or other substances.

Side plates 58 and 60 each have a rear margin 68 that projects rearwardly beyond rear shank edge 30 for use in defining the gap 62. Additionally, each rear margin 68 includes a generally vertically extending series of rectangular holes 70 that serve as part of the means for adjustably supporting tubes 64 and 66 as explained in more detail below.

The upper ends of side plates 58 and 60 are secured to shank 24 by a common transverse bolt 72 at a location determined to be normally above the surface of the ground when the shank assembly is in use.

A downwardly projecting tab 74 (FIG. 2) at the lower extremity of each side plate 58, 60 fits into a corresponding side notch 76 (FIG. 2) in opening to help in retaining the side plate interlocked with base 42.

A second downwardly projecting tab 78 (FIG. 2) at the lower end of each side plate 58 and 60 is spaced rearwardly from front tab 74 and is received within a rearwardly opening recess 80 (FIG. 2) in the rear end of base 42 immediately behind cross bar. The lower ends of side plates 58 and 60 are securely held in place and interlocked with base 42 without the use of transverse fasteners or the like passing through shank 24 and projecting outwardly beyond the outer surfaces of plates 58, 60 in a region that would be susceptible to abrasive wear from the soil.

As illustrated in FIGS. 1 and 2, a pair of fertilizer tubes 64 and 66 is included.

Front tube 64 is generally C-shaped, presenting an upper inlet end 82 that projects upwardly and rearwardly from rear edge 30 of shank 24 for connection with a delivery hose or the like (not shown) from a source of material supply. A straight, intermediate portion 84 of tube 64 lies generally against rear edge 30, and an outturned lower end 86 of tube 64 serves as a discharge end thereof.

Figure 7:
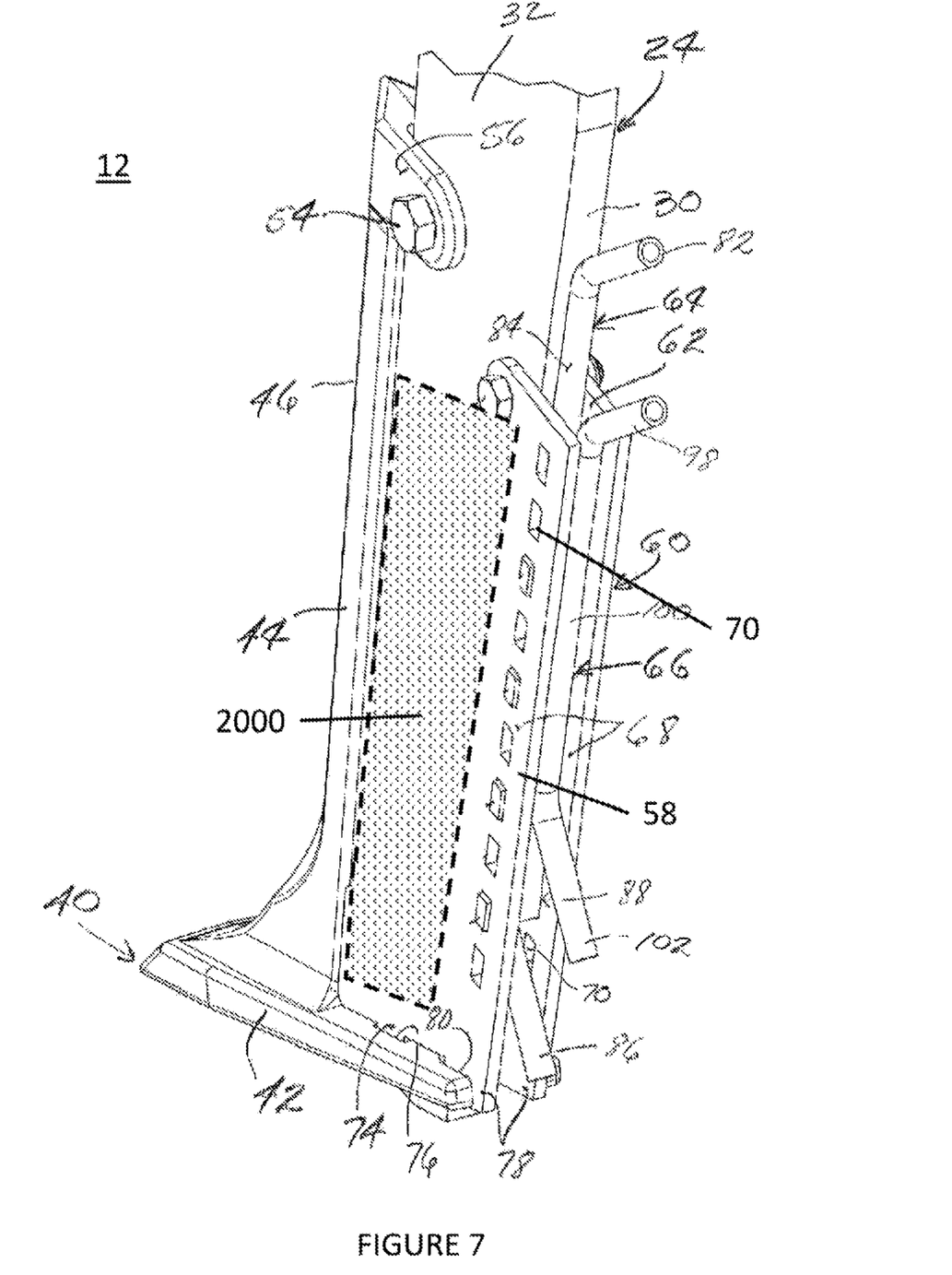
FIG. 7 illustrates another embodiment of a shank assembly with a consumable protection shin.

Tube 64 is conventionally constructed of metal, but that is not a requirement. Welded or otherwise secured to the rear face of intermediate tube portion 84 is a generally I-shaped, flat retainer 88 having a pair of upper oppositely projecting projections 90, 92 (FIG. 7) and a pair of lower oppositely projecting projections 94 and 96 (FIG. 7). Projections 90-96 are shaped complementally with respect to holes 70 and are selectively receivable within a corresponding vertically spaced pair of such holes.

In a similar manner, rear tube 66, which is shorter in overall length than tube 64, is generally C-shaped and has an upper, outturned inlet end 98 adapted to be coupled with a hose or other conduit (not shown) leading from a source of material supply. A straight intermediate portion 100 is adapted to be disposed within gap 62 behind the line of holes 70, and an outturned, lower discharge end 102 directs materials into the ground. Tube 66 is conventionally constructed of metal, although such is not required.

As illustrated in FIGS. 1 and 2, the area 300 of the shank 24 behind the point 40 and in front of the side plates 58 and 60 are subject to abrasive forces as the soil flows over the shank in this area.

More specifically, the valley shape of the area 300 causes the forward edge of the side plates 58 and 60 (shields for the fertilizer tubes) to be subjected to the abrasive forces, thereby negatively impacting the integrity of the side plates 58, 60 (shields for the fertilizer tubes), eventually allowing abrasive forces of the soil to enter the fertilizer (material) delivery tube "chamber" and negatively impact the integrity of the actual fertilizer tubes.

Moreover, due to the non-smooth surface from the shank 24 to the front of the side plates 58 and 60, the valley (300) causes turbulence in the soil flow, further increasing the abrasive forces therefrom.

The abrasive forces of the soil flow causes a farmer to utilize (consume) more side plates (shield) per tip or shoe.

In other words, a farmer replaces the side plates (shields) multiple times due to loss of integrity from the abrasive forces of the soil flow before the farmer needs to replace the tip or shoe due to loss of integrity from the abrasive forces of the soil flow.

A conventional solution to counteracting or dampening the abrasive force of the soil flow has been to weld the leading edge of the side plates 58 and 60 (shields for the fertilizer tubes) to the shank 24.

This conventional solution requires many man hours and requires the removal of the shank from the tractor to make the necessary welds.

The welding solution reduces the number of times that the side plates (shields) need to be replaced per tip or shoe replacement; however, the side plates (shields) still need to be replaced more often than the tip or shoe.

Therefore, it is desirable to provide a solution to counteract or dampen the abrasive force of the soil flow which does not require many man hours to implement.

Moreover, it is desirable to provide a solution to counteract or dampen the abrasive force of the soil flow which does not require the removal of the shank from the tractor to realize the implementation of the solution.

Furthermore, it is desirable to provide a solution to counteract or dampen the abrasive force of the soil flow which extends the life of the side plates (shields) to be substantially equal to the life of the tip or shoe.

In addition, it is desirable to provide a solution to counteract or dampen the abrasive force of the soil flow which does not require many man hours to implement, does not require the removal of the shank from the tractor to realize the implementation of the solution, and extends the life of the side plates (shields) to be substantially equal to the life of the tip or shoe.

BRIEF DESCRIPTION OF THE DRAWINGS

The drawings are only for purposes of illustrating various embodiments and are not to be construed as limiting, wherein.

DETAILED DESCRIPTION

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

Figure 3:
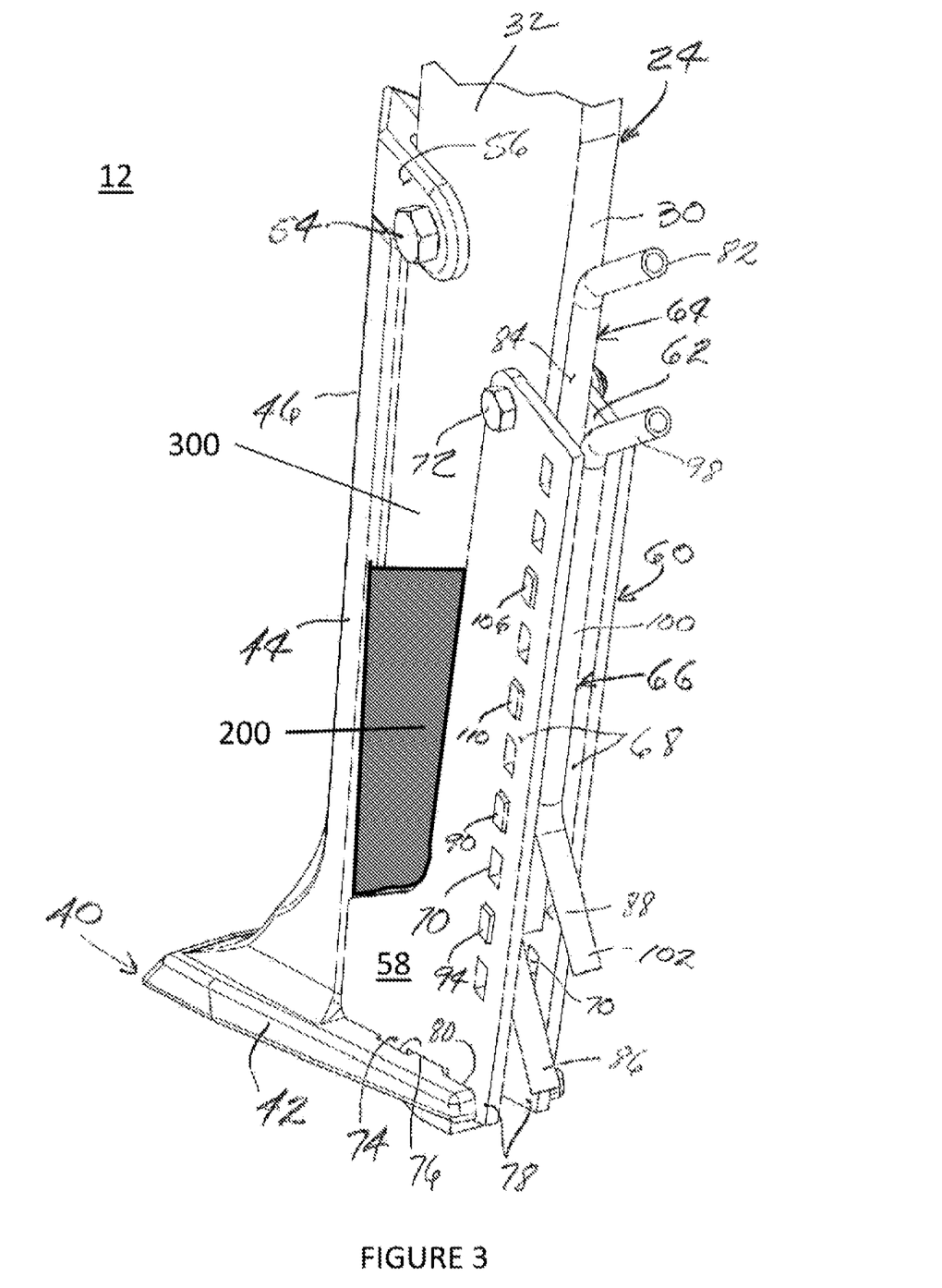
FIG. 3 illustrates a shank assembly with a consumable protection shin.

FIG. 3 illustrates a shank assembly 12 that includes an elongated, generally upright, slightly rearwardly inclined, flat shank 24. Shank 24 is rectangular in transverse cross-section, having a front edge, a flat rear edge 30, and a pair of wide, flat, left and right sides 32.

Shank assembly 12 further includes a point or shoe broadly denoted by the numeral 40 and detachably secured to shank 24. Point 40 is designed to make the primary contacting engagement with the soil instead of shank 24 so as to avoid premature wear of shank. Thus, point 40 is constructed of a hardened material and is designed to be a replaceable (consumable) unit.

Point 40 is generally L-shaped when viewed in side elevation and includes a generally horizontal leg comprising a base 42 and a generally upright leg comprising a front edge guard 4 4. Guard 44 and base 42 are integrally connected parts of a single, L-shaped unit.

Guard 44 is slightly wider than front edge of shank 24 and butts up against front edge of shank 24 when point 40 is in place. A generally upright beveled leading edge 46 of guard 44 serves to cut through the soil and to progressively widen such cut to permit the passage therethrough of the remaining width of shank assembly 12.

As illustrated in FIG. 3, base 42 has a relatively broad, flat chisel nose that progressively transitions to leading edge 46. Base 42 is also substantially wider than guard 44 and shank 24 so as to present a pair of shelf-like wing portions that lead rearwardly from the chisel nose and project laterally outwardly from opposite sides of shank 24.

At the upper end of guard 44, point 40 is held on the shank 24 by a transverse bolt 54 passing through shank 24 and a pair of ears 56 that project rearwardly from guard 44 and embrace opposite sides of shank 24.

Shank assembly 12 further includes a pair of generally L-shaped, flat, side shield plates 58 and 60 held on opposite sides of the shank 24. Side shield plates 58 and 60 are disposed in such a position relative to shank 24 that the side shield plates project rearwardly beyond shank rear edge 30 and cooperatively define a gap or generally U-shaped channel 62 immediately behind rear edge 30. Such gap 62 is adapted to receive and protectively house a pair of generally upright delivery tubes 64 and 66 for fertilizer or other substances.

Side shield plates 58 and 60 each have a rear margin 68 that projects rearwardly beyond rear shank edge 30 for use in defining the gap 62. Additionally, each rear margin 68 includes a generally vertically extending series of rectangular holes 70 that serve as part of the means for adjustably supporting tubes 64 and 66.

The upper ends of side shield plates 58 and 60 are secured to shank 24 by a common transverse bolt 72 at a location determined to be normally above the surface of the ground when the shank assembly is in use.

As illustrated in FIG. 3, a pair of fertilizer tubes 64 and 66 is included.

Front tube 64 is generally C-shaped, presenting an upper inlet end 82 that projects upwardly and rearwardly from rear edge 30 of the shank 24 for connection with a delivery hose or the like (not shown) from a source of material supply. A straight, intermediate portion 84 of tube 64 lies generally against rear edge 30, and an outturned lower end 86 of tube 64 serves as a discharge end thereof.

Tube 64 is conventionally constructed of metal, but that is not a requirement. Welded or otherwise secured to the rear face of intermediate tube portion 84 is a generally I-shaped, flat retainer 88.

In a similar manner, rear tube 66, which is shorter in overall length than tube 64, is generally C-shaped and has an upper, outturned inlet end 98 adapted to be coupled with a hose or other conduit (not shown) leading from a source of material supply. A straight intermediate portion 100 is adapted to be disposed within gap 62 behind the line of holes 70, and an outturned, lower discharge end 102 directs materials into the ground. Tube 66 is conventionally constructed of metal, although such is not required.

As illustrated in FIG. 3, in the area 300 of FIGS. 1 and 2, a consumable protective shin 200 is attached. The consumable protective shin 200 may fill or overlay the entire area 300 of FIGS. 1 and 2 or fill the portion of the area 300 of FIGS. 1 and 2 that is contact with the soil flows.

Thus, the consumable protective shin 200 does not need to fill or overlay the entire area 300 to effectively extend the life of the side shield plates 58 and 60 to be substantially equal to the life of the tip or shoe 40.

The consumable protective shin 200 may be constructed of a plastic material or a material having a hardness less than the hardness of the side shield plates 58 and 60 or shoe 40, thereby allowing the consumable protective shin 200 to be consumed (wore away from the abrasive forces of the soil flow) at a faster rate than the side shield plates 58 and 60. It is noted that the consumable protective shin 200 may be constructed of a thermoplastics, such as nylon 6/6.

Moreover, consumable protective shin 200 may be constructed of a plastic material or a material having a hardness less than the hardness of the side shield plates 58 and 60 or shoe 40, thereby allowing the consumable protective shin 200 to dampen a substantial amount of the abrasive forces of the soil flow and reducing the strength of the abrasive forces interacting with the side shield plates 58 and 60.

The consumable protective shin 200 fills or overlays the area 300 of FIGS. 1 and 2 so as to create a substantially flat or smooth surface from the rear edge of the guard 44 of shoe 40 to a forward edge of the side shield plates 58 and 60.

By filling or overlaying the area 300 of FIGS. 1 and 2 so as to create a substantially flat or smooth surface from the rear edge of the guard 44 of shoe 40 to a forward edge of the side shield plates 58 and 60, the consumable protective shin 200 reduces the turbulence of the soil flow, thereby reducing the impact of the abrasive forces of the soil flow.

Figure 4:
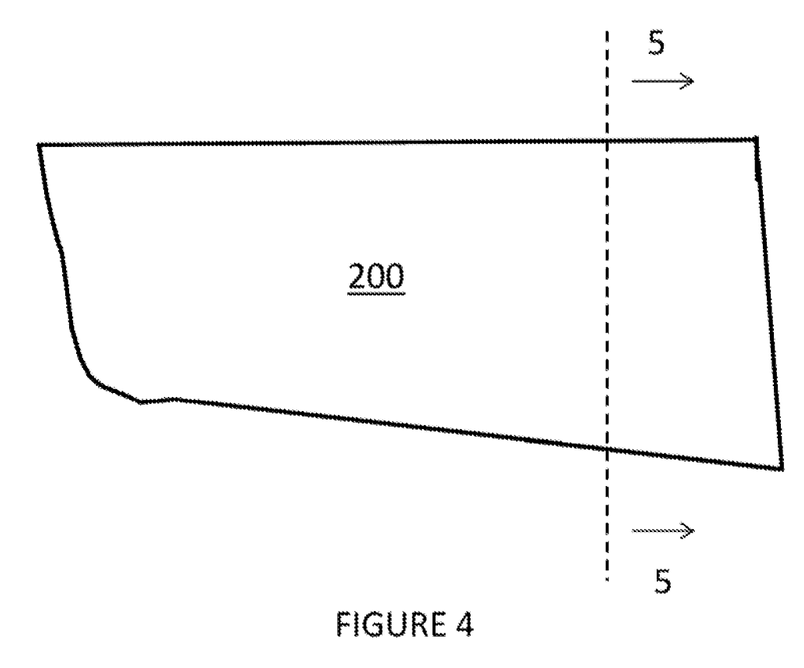
FIG. 4 shows a side perspective of the consumable protection shin of FIG. 3.

As illustrated in FIG. 4, the consumable protective shin 200 is shaped to match the boundary of the portion of the area 300 of FIGS. 1 and 2 that is being filled or overlaid.

Figure 5:
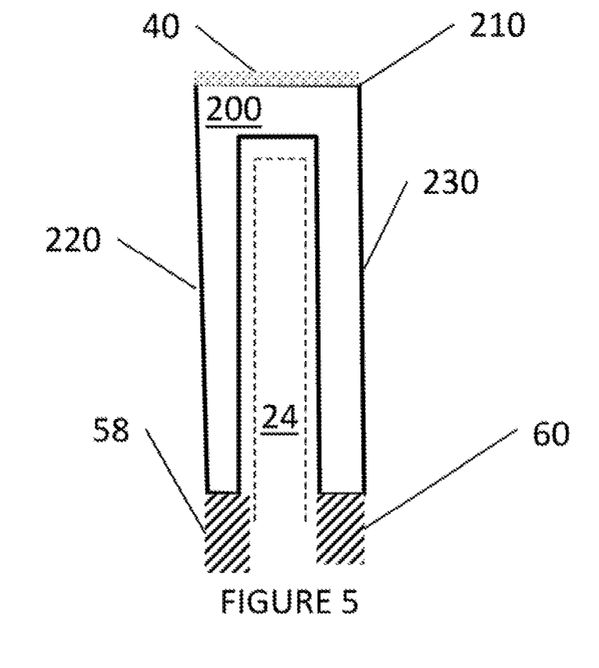
FIG. 5 shows a perspective of the consumable protection shin of FIG. 4 along dotted line 5.

Further as illustrated in FIG. 5, the consumable protective shin 200 is shaped to include a first side 220 and a second side 230 that fill or overlay the corresponding areas 300 of FIGS. 1 and 2 on both sides of the shank 24. The consumable protective shin 200 also has a bottom 210 that overlays a front edge of the shank 24 so as to engage the notch 210 of FIG. 6. The bottom 210 and the sides 220 and 230 of the consumable protective shin 200 form substantially a U-shaped or C-shaped component.

The first side 220 and second side 230 are spaced apart so as to form a volume that receives the shank 24. The first side 220 has an edge that engages side shield plate 58, and the second side 230 has an edge that engages side shield plate 60. The bottom 210 engages the rear edge of the guard 44 of the shoe.

In other words, the first side 220 has a surface from the rear edge of the guard 44 of the shoe to a forward edge of the side shield plate 58, and the second side 230 has a surface from the rear edge of the guard 44 of the shoe to a forward edge of the side shield plate 60.

It is noted that consumable protective shin 200 may not include the bottom 210, but may be two consumable protective shin sides that are appropriately adhered to the portion of area 300 of FIGS. 1 and 2, which is to be filled or overlaid.

Figure 6:
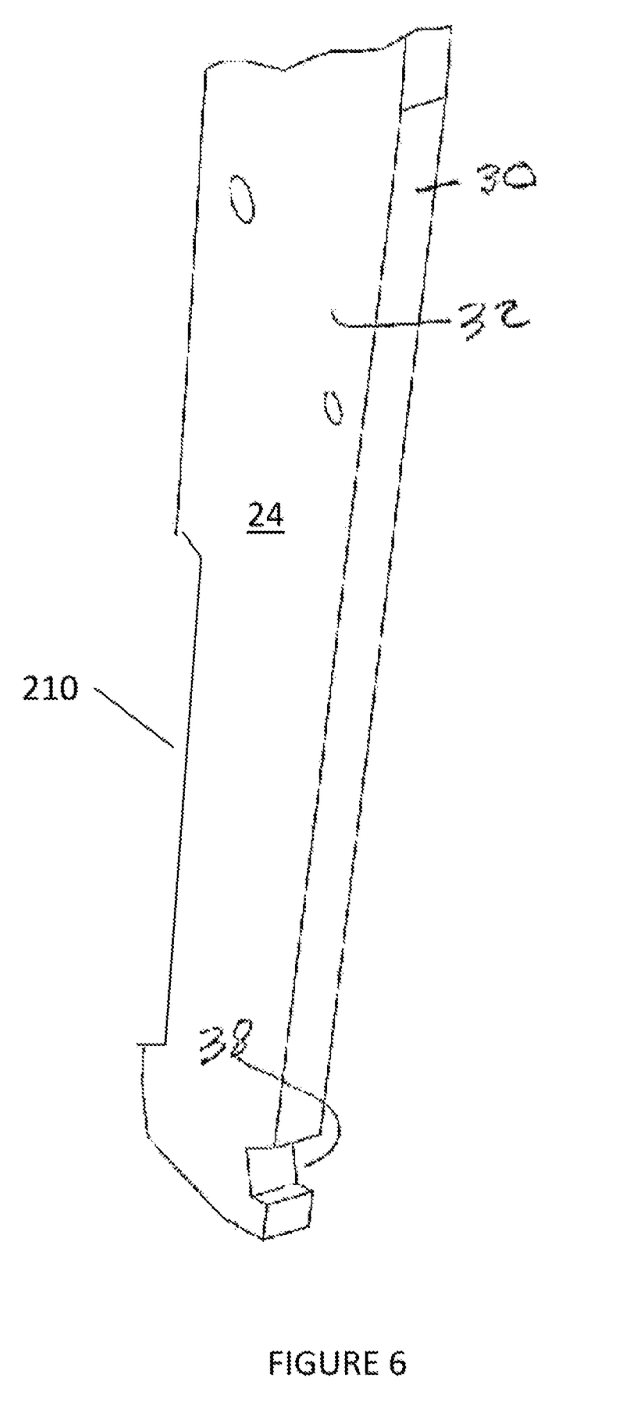
FIG. 6 shows a modified shank for a tillage device.

FIG. 6 illustrates a modified shank 24, which has a notch 210 formed on a front edge of the shank 24. The notch 210 engages a top portion of the consumable protective shin 200 of FIGS. 4 and 5.

The notch 210 secures the consumable protective shin 200 and prevents the consumable protective shin 200 from sliding up or down the shank 24 due to the forces of the soil flow.

FIG. 7 illustrates another shank assembly 12 that includes an elongated, generally upright, slightly rearwardly inclined, flat shank 24. Shank 24 is rectangular in transverse cross-section, having a front edge, a flat rear edge 30, and a pair of wide, flat, left and right sides 32.

Shank assembly 12 further includes a point or shoe broadly denoted by the numeral 40 and detachably secured to shank 24. Point 40 is designed to make the primary contacting engagement with the soil instead of shank 24 so as to avoid premature wear of shank. Thus, point 40 is constructed of a hardened material and is designed to be a replaceable (consumable) unit.

Point 40 is generally L-shaped when viewed in side elevation and includes a generally horizontal leg comprising a base 42 and a generally upright leg comprising a front edge guard 44. Guard 44 and base 42 are integrally connected parts of a single, L-shaped unit.

Shank assembly 12 further includes a pair of generally L-shaped, flat, side shield plates 58 and 60 held on opposite sides of the shank 24 and a pair of fertilizer tubes 64 and 66. Side shield plates 58 and 60 are disposed in such a position relative to shank 24 that the side shield plates project rearwardly beyond shank rear edge 30 and cooperatively define a gap or generally U-shaped channel 62 immediately behind rear edge 30. Such gap 62 is adapted to receive and protectively house a pair of generally upright delivery tubes 64 and 66 for fertilizer or other substances.

Side shield plates 58 and 60 each have a rear margin 68 that projects rearwardly beyond rear shank edge 30 for use in defining the gap 62. Additionally, each rear margin 68 includes a generally vertically extending series of rectangular holes 70 that serve as part of the means for adjustably supporting tubes 64 and 66.

As illustrated in FIG. 7, in the area 300 of FIGS. 1 and 2, a consumable protective shin 2000 is attached. The consumable protective shin 2000 may fill or overlay the entire area 300 of FIGS. 1 and 2 or fill the portion of the area 300 of FIGS. 1 and 2 that is contact with the soil flows.

Moreover, as illustrated in FIG. 7, the consumable protective shin 2000 overlays a portion of the side shield plates 58 and 60.

It is noted, that although not illustrated, the consumable protective shin 2000 may be further extended to overlay the holes 70 of the side shield plates 58 and 60.

Although FIG. 7 illustrates that the consumable protective shin 2000 or overlays substantially all the entire area 300 of FIGS. 1 and 2, the consumable protective shin 2000 does not need to fill or overlay substantially all the entire area 300 of FIGS. 1 and 2 to effectively extend the life of the side shield plates 58 and 60 to be substantially equal to the life of the tip or shoe 40.

The consumable protective shin 2000 may be constructed of a plastic material or a material having a hardness less than the hardness of the side shield plates 58 and 60 or shoe 40, thereby allowing the consumable protective shin 2000 to be consumed (wore away from the abrasive forces of the soil flow) at a faster rate than the side shield plates 58 and 60. It is noted that the consumable protective shin 2000 may be constructed of a thermoplastics, such as nylon 6/6.

Moreover, consumable protective shin 2000 may be constructed of a plastic material or a material having a hardness less than the hardness of the side shield plates 58 and 60 or shoe 40, thereby allowing the consumable protective shin 2000 to dampen a substantial amount of the abrasive forces of the soil flow and reducing the strength of the abrasive forces interacting with the side shield plates 58 and 60.

The consumable protective shin 2000 fills or overlays the area 300 of FIGS. 1 and 2 so as to create a substantially flat or smooth surface from the rear edge of the guard 44 of shoe 40 to a forward edge of the side shield plates 58 and 60.

Alternatively, the consumable protective shin 2000 may fill or overlay the area 300 of FIGS. 1 and 2 so as to create a tapered surface from the rear edge of the guard 44 of shoe 40 to the edge of the consumable protective shin 2000 overlaying the side shield plates 58 and 60. In other words, the width of the consumable protective shin 2000 at its closed end, located at the rear edge of the guard 44 of shoe 40, may be less than the width of the consumable protective shin 2000 at its opened end, located at the edge of the consumable protective shin 2000 overlaying the side shield plates 58 and 60.

By filling or overlaying the area 300 of FIGS. 1 and 2 so as to create a substantially flat or smooth surface (or alternatively a tapered surface) from the rear edge of the guard 44 of shoe 40 to the edge of the consumable protective shin 2000 overlaying the side shield plates 58 and 60, the consumable protective shin 2000 reduces the turbulence of the soil flow, thereby reducing the impact of the abrasive forces of the soil flow.

Figure 8:
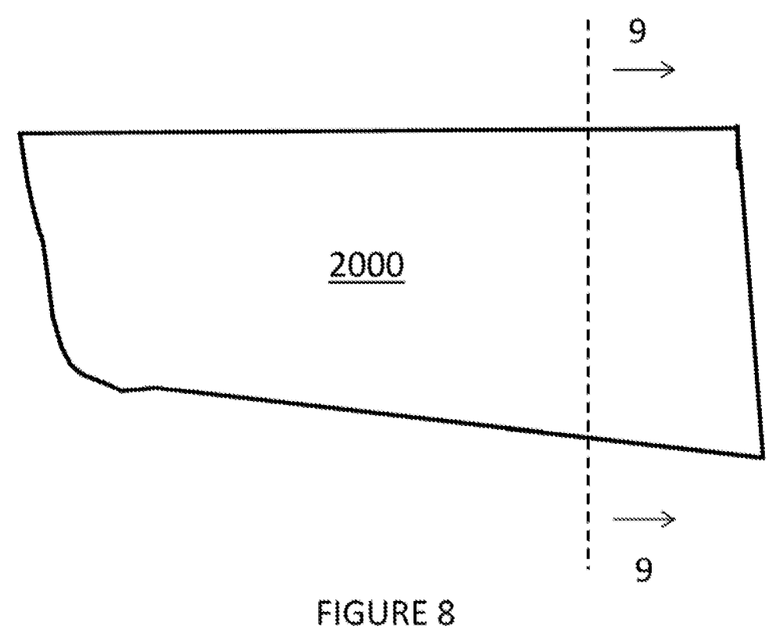
FIG. 8 shows a side perspective of the consumable protection shin of FIG. 7.

As illustrated in FIG. 8, the consumable protective shin 2000 is shaped to match the boundary of the portion of the area 300 of FIGS. 1 and 2 that is being filled or overlaid and the portion of the side shield plates 58 and 60 being overlaid.

Figure 9:
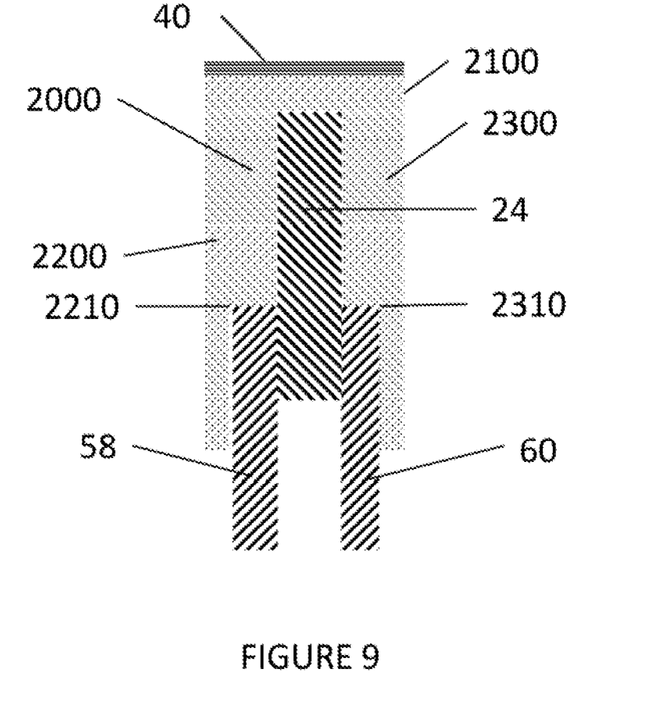
FIG. 9 shows a perspective of the consumable protection shin of FIG. 8 along dotted line 9.

Further as illustrated in FIG. 9, the consumable protective shin 2000 is shaped to include a first side 2200 and a second side 2300 that fill or overlay the corresponding areas 300 of FIGS. 1 and 2 on both sides of the shank 24. The consumable protective shin 2000 also has a bottom 2100 that overlays a front edge of the shank 24 so as to engage the notch 210 of FIG. 6. The bottom 2100 and the sides 2200 and 2300 of the consumable protective shin 2000 form substantially a U-shaped or C-shaped component.

The first side 2200 and second side 2300 are spaced apart so as to form a volume that receives the shank 24. The first side 2200 has a notch 2210 that engages side shield plate 58 so that a portion of the first side 2200 can overlay a portion of the side shield plate 58, and the second side 2300 has a notch 2310 that engages side shield plate 60 so that a portion of the first side 2300 can overlay a portion of the side shield plate 60. The bottom 2100 engages the rear edge of the guard 44 of the shoe.

In other words, the first side 2200 has a surface from the rear edge of the guard 44 of the shoe to a forward edge of the side shield plate 58, and the second side 2300 has a surface from the rear edge of the guard 44 of the shoe to a forward edge of the side shield plate 60.

It is noted that consumable protective shin 2000 may not include the bottom 2100, but may be two consumable protective shin sides that are appropriately adhered to the portion of area 300 of FIGS. 1 and 2, which is to be filled or overlaid.

Figure 10:
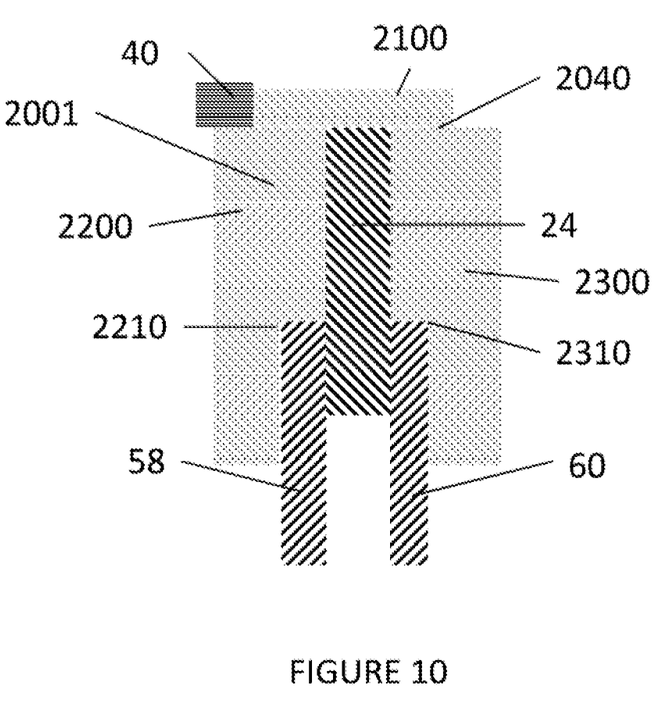
FIG. 10 shows a perspective of another embodiment of the consumable protection shin of FIG. 8 along dotted line 9.

As illustrated in FIG. 10, the consumable protective shin 2001 is shaped to include a first side 2200 and a second side 2300 that fill or overlay the corresponding areas 300 of FIGS. 1 and 2 on both sides of the shank 24. The consumable protective shin 2001 also has a bottom 2100 that overlays a front edge of the shank 24 so as to engage the notch 210 of FIG. 6. The bottom 2100 and the sides 2200 and 2300 of the consumable protective shin 2001 form substantially a U-shaped or C-shaped component.

The first side 2200 and second side 2300 are spaced apart so as to form a volume that receives the shank 24. The first side 2200 has a notch 2210 that engages side shield plate 58 so that a portion of the first side 2200 can overlay a portion of the side shield plate 58, and the second side 2300 has a notch 2310 that engages side shield plate 60 so that a portion of the first side 2300 can overlay a portion of the side shield plate 60. The bottom 2100 engages the rear edge of the guard 44 of the shoe.

In other words, the first side 2200 has a surface from the rear edge of the guard 44 of the shoe to a forward edge of the side shield plate 58, and the second side 2300 has a surface from the rear edge of the guard 44 of the shoe to a forward edge of the side shield plate 60.

Consumable protective shin 2001, as illustrated in FIG. 10, may be notched 2040 in the bottom 2100 so as to engage the rear edge of the guard 44 of the shoe. This allows the notch 210 of FIG. 6 to be shallower if there is a sufficient enough gap between the shank 24 and the guard 44 of the shoe to so that the thickness of the engaged bottom 2100 can effectively holding the shin 2001 in place with the shank 24.

In summary, a consumable protective shin is mounted onto or attached to the shank of a tilling device in the area from the rear edge of the guard of the shoe to a forward edge of the side shield plates to fill or overlay this area.

Alternatively, a consumable protective shin is mounted onto or attached to the shank of a tilling device in the area from the rear edge of the guard of the shoe to an edge of the consumable protective shin which overlays a portion of the side shield plates.

The inclusion of the consumable protective shin dampens a substantial amount of the abrasive forces of the soil flow and reduces the strength of the abrasive forces interacting with the side shield plates.

The inclusion of the consumable protective shin also allows the consumable protective shin to be consumed (wore away from the abrasive forces of the soil flow) at a faster rate than the side shield plates, thereby extending the effective life of the side shield plates.

The consumable protective shin can be easily replaced by disengaging the shoe from the shank, removing the "consumed" consumable protective shin, placing a new consumable protective shin therein, and re-engaging the shoe to the shank. This operation can be done in the field and does not require the removal of the tilling device from the tractor.

In addition, the utilization of the consumable protective shin can extend the effective life of the side shield plates so that the effective life of the side shield plates substantially outlasts the effective life of the shoe.

Moreover, by constructing the consumable protective shin of a plastic material, it can be inexpensively manufactured compared to the manufacturing costs of the side shield plates. Thus, the consumption of the consumable protective shins over the multiple replacements of the side shield plates per replacement of the shoe effectively reduces the overall costs of materials utilized per unit acre plowed.

A consumable shin for a tillage shank comprises an integral U-shaped shin having a first side, a second side, and a bottom; the first side and the second side being spaced apart to form a volume therebetween; the first side having a first side surface having first side length and a first side width; the second side having a second side surface having a second side length and a second side width; the first side length being from a rear edge of a guard of a shoe engaging the tillage shank to a forward edge of a first side shield engaging the tillage shank; the second side length being from the rear edge of the guard of the shoe engaging the tillage shank to a forward edge of a second side shield engaging the tillage shank.

The integral U-shaped shin may be constructed of a material having a hardness less than a hardness of the side shields. The integral U-shaped shin may be constructed of a material having a hardness less than a hardness of the guard of the shoe.

The integral U-shaped shin may be constructed of a plastic. The integral U-shaped shin may be constructed of a thermoplastic. The integral U-shaped shin may be constructed of a nylon.

A consumable shin for a tillage shank, comprises an integral U-shaped shin having a first side, a second side, and a bottom; the first side and the second side being spaced apart to form a volume therebetween; the first side having a first side surface having first side length and a first side width; the second side having a second side surface having a second side length and a second side width; the first side having a first side notch for engaging a forward edge of a first side shield engaging the tillage shank; the second side having a second side notch for engaging a forward edge of a second side shield engaging the tillage shank; the first side length being from a rear edge of a guard of a shoe engaging the tillage shank to a location on the first side shield engaging the tillage shank such that the first side overlays a portion of the first side shield engaging the tillage shank; the second side length being from a rear edge of a guard of a shoe engaging the tillage shank to a location on the second side shield engaging the tillage shank such that the second side overlays a portion of the second side shield engaging the tillage shank.

The integral U-shaped shin may be constructed of a material having a hardness less than a hardness of the side shields. The integral U-shaped shin may be constructed of a material having a hardness less than a hardness of the guard of the shoe.

The integral U-shaped shin may be constructed of a plastic. The integral U-shaped shin may be constructed of a thermoplastic. The integral U-shaped shin may be constructed of a nylon.

A tillage shank assembly comprises a tillage shank; a shoe; a first side shield; a second side shield; and a consumable shin; the shank tillage having a notch to engage the consumable shin.

The consumable shin may be integral and U-shaped, having a first side, a second side, and a bottom; the first side and the second side being spaced apart to form a volume therebetween; the first side having a first side surface having first side length and a first side width; the second side having a second side surface having a second side length and a second side width; the first side length being from a rear edge of a guard of the shoe engaging the tillage shank to a forward edge of the first side shield engaging the tillage shank; the second side length being from the rear edge of the guard of the shoe engaging the tillage shank to a forward edge of the second side shield engaging the tillage shank.

The consumable shin may be constructed of a material having a hardness less than a hardness of the first side shield and having a hardness less than a hardness of the second side shield.

The consumable shin may be constructed of a plastic. The consumable shin may be constructed of a thermoplastic. The consumable shin may be constructed of a nylon.

It will be appreciated that several of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above.

What is claimed is:

1. A consumable shin for a tillage shank having a removable shoe with a soil cutting surface and side shields, the removable shoe being removable from the tillage shank, comprising:
   an integral U-shaped non-soil cutting shin having a first side, a second side, and a bottom side;
   said first side and said second side being spaced apart to form a volume therebetween;
   said first side having a first surface having a first surface length and a first surface width;
   said first side having a second surface having a second surface length and a second surface width;
   said second side having a third surface having a third surface length and a third surface width;
   said second side having a fourth surface having a fourth surface length and a fourth surface width;
   said bottom side having a fifth surface and a sixth surface, said sixth surface being a flat non-soil cutting surface, said sixth surface being in parallel with said fifth surface;
   said fifth surface being connected to said second surface and said fourth surface;

said fifth surface, said second surface, and said fourth surface being configured to engage the tillage shank;

said sixth surface being connected to said first surface and said third surface;

said sixth surface being configured to engage the removable shoe.

2. The consumable shin as claimed in claim 1, wherein said integral U-shaped non-soil cutting shin is constructed of a material having a hardness less than a hardness of the side shields.

3. The consumable shin as claimed in claim 1, wherein said integral U-shaped non-soil cutting shin is constructed of a material having a hardness less than a hardness of the guard of the removable shoe.

4. The consumable shin as claimed in claim 1, wherein said integral U-shaped non-soil cutting shin is constructed of a plastic.

5. The consumable shin as claimed in claim 1, wherein said integral U-shaped non-soil cutting shin is constructed of a thermoplastic.

6. The consumable shin as claimed in claim 1, wherein said integral U-shaped non-soil cutting shin is constructed of a nylon.

7. A consumable shin for a tillage shank having a removable shoe with a soil cutting surface, a first side shield and a second side shield, the removable shoe being removable from the tillage shank, comprising:

an integral U-shaped non-soil cutting shin having a first side, a second side, and a bottom side;

said first side and said second side being spaced apart to form a volume therebetween;

said first side having a first surface having a first surface length and a first surface width;

said first side having a second surface having a second surface length and a second surface width;

said second side having a third surface having a third surface length and a third surface width;

said second side having a fourth surface having a fourth surface length and a fourth surface width;

said first side having a first side notch for engaging a forward edge of the first side shield engaging the tillage shank;

said second side having a second side notch for engaging a forward edge of the second side shield engaging the tillage shank;

said bottom side having a fifth surface and a sixth surface, said sixth surface being a flat non-soil cutting surface, said sixth surface being in parallel with said fifth surface;

said fifth surface being connected to said second surface and said fourth surface;

said fifth surface, said second surface, and said fourth surface being configured to engage the tillage shank;

said sixth surface being connected to said first surface and said third surface;

said sixth surface being configured to engage the removable shoe.

8. The consumable shin as claimed in claim 7, wherein said integral U-shaped non-soil cutting shin is constructed of a material having a hardness less than a hardness of the side shields.

9. The consumable shin as claimed in claim 7, wherein said integral U-shaped non-soil cutting shin is constructed of a material having a hardness less than a hardness of the guard of the removable shoe.

10. The consumable shin as claimed in claim 7, wherein said integral U-shaped non-soil cutting shin is constructed of a plastic.

11. The consumable shin as claimed in claim 7, wherein said integral U-shaped non-soil cutting shin is constructed of a thermoplastic.

12. The consumable shin as claimed in claim 7, wherein said integral U-shaped non-soil cutting shin is constructed of a nylon.

13. A tillage shank assembly comprising:

a tillage shank;

a removable shoe with a soil cutting surface;

said removable shoe being removable from said tillage shank;

a first side shield;

a second side shield; and a consumable U-shaped non-soil cutting shin having a first side, a second side, and a bottom side;

said tillage shank having a notch to engage said consumable U-shaped non-soil cutting shin;

said bottom side of said consumable U-shaped non-soil cutting shin being located between said tillage shank and said removable shoe;

said bottom side having a first surface and a second surface, said second surface being a flat non-soil cutting surface, said second surface being in parallel with said first surface, said first surface being configured to engage said notch, said second surface being configured to engage said removable shoe.

14. The tillage shank assembly as claimed in claim 13, wherein said consumable U-shaped non-soil cutting shin is integral;

said first side and said second side being spaced apart to form a volume therebetween.

15. The tillage shank assembly as claimed in claim 13, wherein said consumable U-shaped non-soil cutting shin is constructed of a material having a hardness less than a hardness of said first side shield and having a hardness less than a hardness of said second side shield.

16. The tillage shank assembly as claimed in claim 13, wherein said consumable U-shaped non-soil cutting shin is constructed of a plastic.

17. The tillage shank assembly as claimed in claim 13, wherein said consumable U-shaped non-soil cutting shin is constructed of a thermoplastic.

18. The tillage shank assembly as claimed in claim 13, wherein consumable U-shaped non-soil cutting shin is constructed of a nylon.

* * * * *